(12) United States Patent
Bouckaert et al.

(10) Patent No.: US 8,565,220 B2
(45) Date of Patent: Oct. 22, 2013

(54) SIGNALING STATUS INFORMATION OF AN APPLICATION SERVICE

(75) Inventors: Philippe Bouckaert, Sophia-Antipolis (FR); Anne Rigault, Sophia-Antipolis (FR); Didier Varroni, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1488 days.

(21) Appl. No.: 12/078,260

(22) Filed: Mar. 28, 2008

(65) Prior Publication Data

US 2008/0240086 A1 Oct. 2, 2008

(30) Foreign Application Priority Data

Mar. 30, 2007 (EP) .................................. 07300912

(51) Int. Cl.
*H04L 12/66* (2006.01)
(52) U.S. Cl.
USPC ..................... 370/352; 379/229; 379/221.01
(58) Field of Classification Search
USPC .......................................... 379/229, 221.01
See application file for complete search history.

(56) References Cited

U.S. PATENT DOCUMENTS

2002/0059423 A1* 5/2002 Leymann et al. ............. 709/226
2003/0118001 A1 6/2003 Prasad et al.
2004/0054984 A1* 3/2004 Chong et al. .................. 717/103
2005/0232407 A1* 10/2005 Craig et al. .................... 379/229
2006/0153202 A1* 7/2006 Dantu et al. ............. 370/395.52
2010/0030905 A1* 2/2010 Fikouras et al. .............. 709/228

FOREIGN PATENT DOCUMENTS

| WO | WO-03/017599 A1 | 2/2003 |
| WO | WO-2006/004995 A | 1/2006 |

OTHER PUBLICATIONS

Loughney, J. et al., "SSY SCCP—User Adaptation Layer (SUA)", IETF Standard-Working Draft, Internet Engineering Task Force, vol. Sigtran, No. 4, pp. 1-82, Nov. 24, 2000.

* cited by examiner

*Primary Examiner* — Luat Phung
*Assistant Examiner* — Najeebuddin Ansari

(57) ABSTRACT

There is provided a method of signaling status information of an application service. The method is performed by a signaling gateway which interconnects an internet protocol network and a signaling system 7 network. The method comprises collecting application server status information of application servers associated with the application service and generating the status information of the application service from the collected application server status information by use of a given set of rules. The status information is generated for signaling the status information to at least one peer. The at least one peer can be comprised in the internet protocol network or in the signaling system 7 network.

11 Claims, 5 Drawing Sheets

SIGNALING STATUS INFORMATION OF AN APPLICATION SERVICE

This application claims priority from European patent application 07300912.8, filed on Mar. 30, 2007. The entire content of the aforementioned application is incorporated herein by reference.

FIELD OF THE INVENTION

The invention relates to a method of signaling status information of an application service, to a computer program product comprising computer executable instructions that are adapted to perform the method in accordance with the invention, and to a signaling gateway for interconnecting an internet protocol network and a signaling system 7 network.

BACKGROUND AND RELATED ART

There is an ongoing integration trend between switched circuit networks (SCN) and internet protocol (IP) networks that, using the effective way to transport user data provided by IP networks, intends to get a less restrictive and network independent way of providing and deploying telecommunication services. The term SCN is used in this invention to refer to a network that carries traffic (normally, telephony traffic) within channeled bearers of predefined sizes. Examples of SCN include public switched telephone networks (PSTN), integrated services digital networks (ISDN) or public land mobile networks (PLMNs), such as a global system for mobile communications (GSM) network. The term IP network is used in this invention to refer to a network that carries traffic (normally, data traffic) within data packets.

A goal in such integration trend is to grant interoperation between end points (signaling end points or voice/multimedia terminal devices) allocated in SCN and in IP networks. Another goal in such integration trend is to allow allocation of nodes/functions, traditionally located in the SCN, into the IP network; thus allowing telecommunication operators to expand their networks and to speed up the deployment of new or existing services. An example could be the provision of a GSM node, such as a home location register node, in an IP network.

In this context, the transport of traditional SCN signaling messages over IP networks has been viewed as one of the main areas of concern and has been addressed by the signaling transport (SIGTRAN) working group of the internet engineering taskforce (IETF). The SIGTRAN working group defines an architecture and related protocols to support transport of SCN signaling (or SCN signaling messages) over IP networks in order to ensure a smooth and transparent interworking between telecommunication nodes regardless whether the nodes are located in the SCN or in the IP network. Examples of traditional SCN signaling protocols suitable to be transported over IP networks are: Q.931; signaling system number 7 (SS7) message transfer part (MTP); MTP layer-3 (MTP3) user part protocols or signaling connection control part (SCCP); user protocols, like mobile application part (MAP) over transaction capabilities application part (TCAP) etc.

In this scenario, two kinds of nodes were identified by SIGTRAN. Nodes performing functions relating to signaling conversion, named signaling gateways (SGs), intended to provide an interworking between nodes located in SCNs and nodes located in IP networks. The other kind of nodes performing functions related to signaling applications located in the IP network (IP-located nodes), named application servers (ASs). Hereinafter, throughout this document, the terms SG and AS will be used to refer to the logical entity that performs, respectively, an SG function and an AS function, regardless of whether such functions are distributed over one or more hosts of the IP network and also in order to refer to the physical entity (physical machine or physical node) that, respectively, implements or contains a SG function or an AS function.

The internet standard defining the general architecture for SIGTRAN (specified in the document RFC2719) specifies a set of three elements that would have to be implemented by any node involved in the transport of SCN signaling over IP networks (SG and AS), and that will have to be performed by the processes that implement the corresponding functionalities (a process which implements the functionality of a signaling gateway is also referred to as signaling gateway process, and a process which implements the functionality of an application server is referred to as an application server process). These elements are intended to interact with each other in a layered way within the same node's serving process, and each of them is intended to communicate with its respective peer or peer element in the interworking nodes serving process by using the services provided by the adjacent lower element in its node. These elements are: the SCN adaptation module, the common signaling transport and the standard IP transport. The SCN adaptation module is intended to be specific for the type of SCN protocol to be transported. The common signaling transport and the standard IP transport are intended to be common regardless of the SCN protocol to be transported.

For this extent, SIGTRAN working group has developed a set of internet standards that define: a set of user adaptation layers (UA) (one per type of SCN protocol to be transported), that implements the aforementioned SCN adaptation module; and a transport protocol, the stream control transmission protocol SCTP (defined in RFC2960) to be used over IP, that implements the aforementioned common signal transport, and that is able to run directly over IP. Regarding more specifically user adaptation layers (UA), SIGTRAN is defining, among others, four protocols: MTP3-user adaptation layer (M3UA), MTP2-user adaptation layer (M2UA), ISDNQ.921-user adaptation layer (IUA), and SCCP-user adaptation layer (SUA).

An application server (AS) in the IP network can be in one of the following states. The application server can be available, e.g., for a requesting peer, or unavailable, or congested. The status of an application server might also change, for example from available to unavailable or vice versa.

An application server in the IP network is identifiable by a routing key. A routing key can for example comprise a point code (PC) and a subsystem number (SSN) assigned to the application server as well as other criteria assigned to the application server. A routing key is for example specified in message fields of messages exchanged by use of the aforementioned protocols. A routing key is therefore not only a 'simple' address information. A routing key may be specified for each kind of destination and source address, e.g., an application server could handle all the SS7 messages containing a core address with predefined digits.

The signaling gateway is in charge of distributing the data traffic from the SS7 network to the IP network and vice versa. A peer might want to send data traffic to an application server. The peer therefore specifies in the routing key employed for routing the data traffic to the application server the point code (PC) and the subsystem number (SSN) of the application server as well as other criteria of the application server. In order to send the data traffic by use of the PC and SSN to the application server, the peer must be aware of the application status of the application server. The signaling gateway is however currently not able to forward the status of an application server to a peer located in the SS7 network or in the IP network.

Further, an application service can be implemented by a plurality of application servers on the IP-network, wherein all application servers associated with the application service share the same point code and subsystem number. Some of the application servers of the plurality of the application servers might be available, while others might be unavailable or congested. As some of the application servers are available, the application service is available. However, there is currently no satisfying solution for signaling the availability or unavailability of an application service being associated with available as well as unavailable or congested application servers to a requesting peer.

SUMMARY OF THE INVENTION

It is an object of the invention to provide an improved method for signaling the status information of an application service to a peer which wants to send data traffic to the correspond application service.

It is another object of the invention to provide an improved method for signaling status information of an application service in general.

Another object of the invention is to provide an improved computer program product which is adapted to perform the method in accordance with the invention. Moreover, it is an object of the invention to provide an improved signaling gateway.

According to a first aspect of the invention, there is provided a method of signaling status information of an application service. In accordance with an embodiment of the invention, the method is performed by a signaling gateway. The signaling gateway interconnects an IP network and a SS7 network. The method in accordance with the invention comprises the step of collecting application service status information of application servers associated with the application service. In a further step, the status information of the application service is generated from the collected application server status information by use of a given set of rules, wherein the status information is generated for signaling the status information to at least one peer which is, comprised in the IP network or in the SS7 network.

The signaling gateway collects application server status information of application servers. The collected information is then used to generate the status information of the application service implemented by the corresponding application servers. The status information might be required for the peer in order to get notice of the availability of the application service. The peer is then able to transmit the data traffic to the application service by use of the corresponding point code and subsystem number in the routing keys for the data traffic.

In accordance with an embodiment of the invention, an application server is hosted by one or more nodes of the IP network. An application server is furthermore identifiable by a point code (PC), a subsystem number (SSN), and other criteria (cr). The application servers associated with the application service share the same point code and subsystem number.

An application service might be implemented on the IP network via one or more application servers, whereby the application servers share the same subsystem number and point code. The peer which wants to send data packets to the application service employs the point code and subsystem number of the application service in the routing keys of the headers of the data packets in order to address the application service. The peer must however be aware of the status information of the application service before the peer is able to transmit the data. As the application service can be implemented by several application servers on the IP side, the method is particularly advantageous as the status information of the application servers are collected by the signaling gateway and the status information of the application service which is generated from the collected status information is then sent to the peer. The peer is then able after reception of the status information of the application service to decide whether or not it will send the data packets.

In accordance with an embodiment of the invention, the application server status information of an application server specifies the status of the application server as being 'available' or 'unavailable' or 'congested'. The application server status information is collected by receiving a signaling, connection control part (SCCP) subsystem allowed (SSA) message or a SCCP subsystem prohibited (SSP) message or a SCCP subsystem congested (SSC) message from the application server. The SCCP SSA message indicates the availability of the application server and the SCCP SSP message indicates the unavailability of the application server. The SCCP SSC message indicates that the application server is congested.

In accordance with an embodiment of the invention, the signaling gateway monitors the status of an application server by sending an SCCP subsystem test (SST) message to the application server, wherein in response to the SCCP SST message the SCCP SSA message or the SCCP SSP message or the SCCP SSC message is received from the application server depending on the status of the application server.

In accordance with an embodiment of the invention, the signaling gateway sends, e.g. periodically, a SCCP SST message to an application server in response to the reception of a SCCP SSP message or a SCCP SSC message from the application server or in response to the reception of a message transfer part (MTP)-resume message. The signaling gateway monitors, e.g., periodically an application server by sending a SCCP SST message to the application server after it has received a SCCP SSP message or a SCCP SSC message from the application server in order detect a change of the status of the application server from "unavailable" or "congested" to "available". The signaling gateway has therefore always up-to-date information about the states of the application servers.

In accordance with an embodiment of the invention, the application server status information of the application servers are stored in a database linked with the signaling gateway, wherein the database is updated with respect to the status information of an application server, if a SCCP SSA or a SCCP SSP message or a SCCP SSC message is received from the application server. The application server status information received by the signaling gateway from the application servers are stored on the database. The signaling gateway is then able to generate the status information for an application service in response to the reception of application server status information from an application server which indicated that the status of this application server has been changed from, e.g. "available" to "unavailable" or "congested", without the need of requesting the application server status information from all other application servers associated with the corresponding application service.

In accordance with an embodiment of the invention, the given set of rules specifies that a SCCP SSP message is sent to the at least one peer, if all application servers associated with the application service are unavailable.

In accordance with an embodiment of the invention, the given set of rules specifies that a SCCP SSA message is sent to the at least one peer, if at least one application server associated with the application service is available.

In accordance with an embodiment of the invention, the given set of rules specifies that a SCCP SSC message is sent to the at least one peer, if at least one application server associated with the application service is congested.

In accordance with an embodiment of the invention, the given set of rules specifies that an error message in accordance with a protocol is sent in order to indicate the unavailability or congestion of an application service or of an application server, wherein the protocol is on top of the SCCP protocol.

In accordance with an embodiment of the invention, the status information is broadcasted to the at least one peer, wherein the at least one peer is associated with the application service, or wherein the at least one peer has been requested the status information.

In accordance with an embodiment of the invention, the status information of the application service is sent to the at least one peer before the peer sends data traffic to an application server associated with the application service by use of the point code and subsystem number of the application server in the routing keys which are used for routing the data packets of the data traffic. The status information signals the availability or unavailability of the application service to the peer prior to the sending of the data traffic.

According to a further aspect of the invention, there is provided a computer program product which is adapted to be executable by a signaling gateway. The signaling gateway interconnects an IP network and a signaling system 7 network. The computer program product comprises computer executable instructions which are adapted to collect application server status information of application servers associated with an application service. The instructions are further adapted to generate the status information of the application service from the collected application server status information by use of a given set of rules, wherein the status information is generated for signaling the status information to at least one peer, wherein the at least one peer is comprised in the IP network or in the SS7 network.

According to another aspect of the invention, there is provided a signaling gateway for interconnecting an IP network and a SS7 network.

BRIEF DESCRIPTION OF THE DRAWINGS

In the following embodiments of the invention will be described in greater detail by way of example only making reference to the drawings in which.

DETAILED DESCRIPTION

Figure 1:
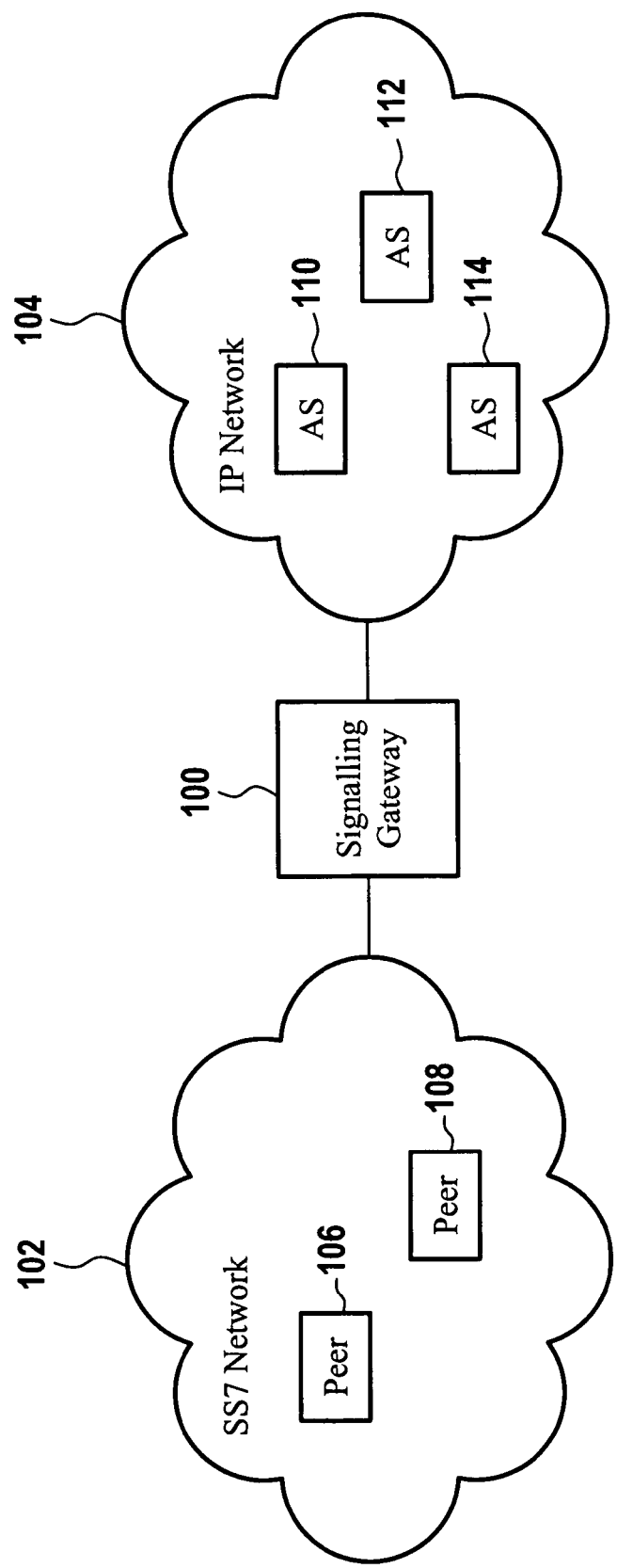
FIG. 1 shows schematically a signaling gateway interconnecting a SS7 network and an IP network.

FIG. 1 shows schematically a signaling gateway 100 interconnecting a SS7 network 102 and an IP network 104. As described previously, and as defined by IETF's SIGTRAN group, there are two kinds of nodes: signaling gateways and application servers. Application servers, such as application servers 110, 112, and 114 are thereby virtual elements that implement a telecommunication node located in the internet protocol network 104 and that communicate with one or more telecommunication nodes, so called peers, such as peer 106 and 108, located in the SS7 network 102.

Signaling gateways, such as the signaling gateway 100, provide interfaces for interconnecting the IP network 104 and the SS7 network 102. A signaling gateway might furthermore be a component on the IP network 104 or of the SS7 network 102 and thereby be hosted by one of the nodes of the corresponding networks 102 or 104.

The connection between the signaling gateway 100 and the peers 106 or 108 is performed by traditional SCN signaling links (the links are not shown in FIG. 1), and the connection between the signaling gateway 100 and the application servers 110 to 114 is achieved by means of transport connections using a transport protocol that, in turn, runs over the IP protocol. When such transport connections are made using SCTP as transport protocol, they are called in SIGTRAN's terminology 'SCTP-associations'.

Figure 2:
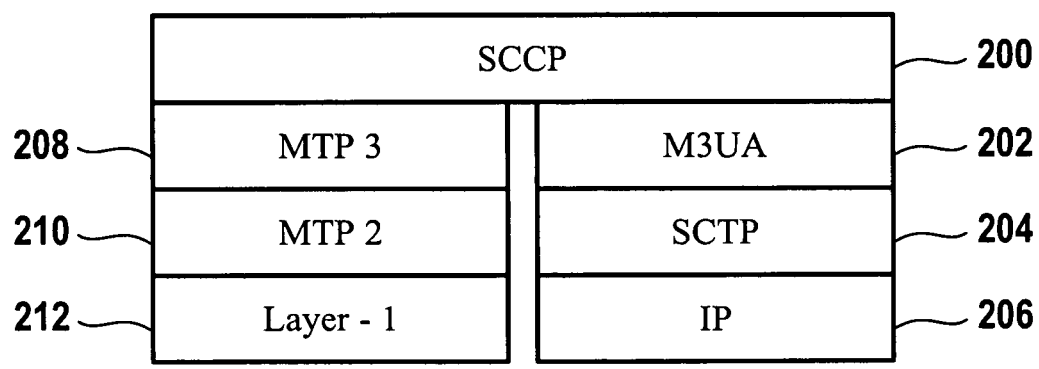
FIG. 2 shows a logical view of a layered communication through a signaling gateway interconnecting an SS7 network and an IP network.

FIG. 2 shows a logical view of a layered communication through a signaling gateway interconnecting a SS7 network and an IP network. The signaling gateway is basically a network component which is responsible for translating signaling messages received from the IP network to the SS7 network and vice versa. The interconnection between the IP network and the SS7 network is realized by the SCCP-layer 200 or to be more precise, by a nodal interworking function on top of the SCCP-layer 200. With respect to the IP network site of the signaling gateway, the layer below the SCCP-layer 200 is referred to as M3UA-layer 202. The layer below the M3UA-layer 202 is called SCTP-layer 204. The layer below the SCTP-layer 204 is the IP-layer 206.

With respect to the SS7 site, the layers below the SCCP-layer 200 are referred to as MTP3-layer 208, as MTP2-layer 210, and as layer-1 212. Each of the layers are specified by the SIGTRAN group as already mentioned in the background section. A main characteristic of the MTP3-layer 208 and the M3UA-layer 202 is that a node in the SS7 network or in the IP network is characterized by a point code assigned to the node. An application server in the IP network can therefore be reached from the perspective of the MTP3-layer 208 by specifying the point code of the application server. Furthermore, subsystem numbers are used to identify applications (running on the application servers) with respect to the SCCP-layer 200.

Figure 3:
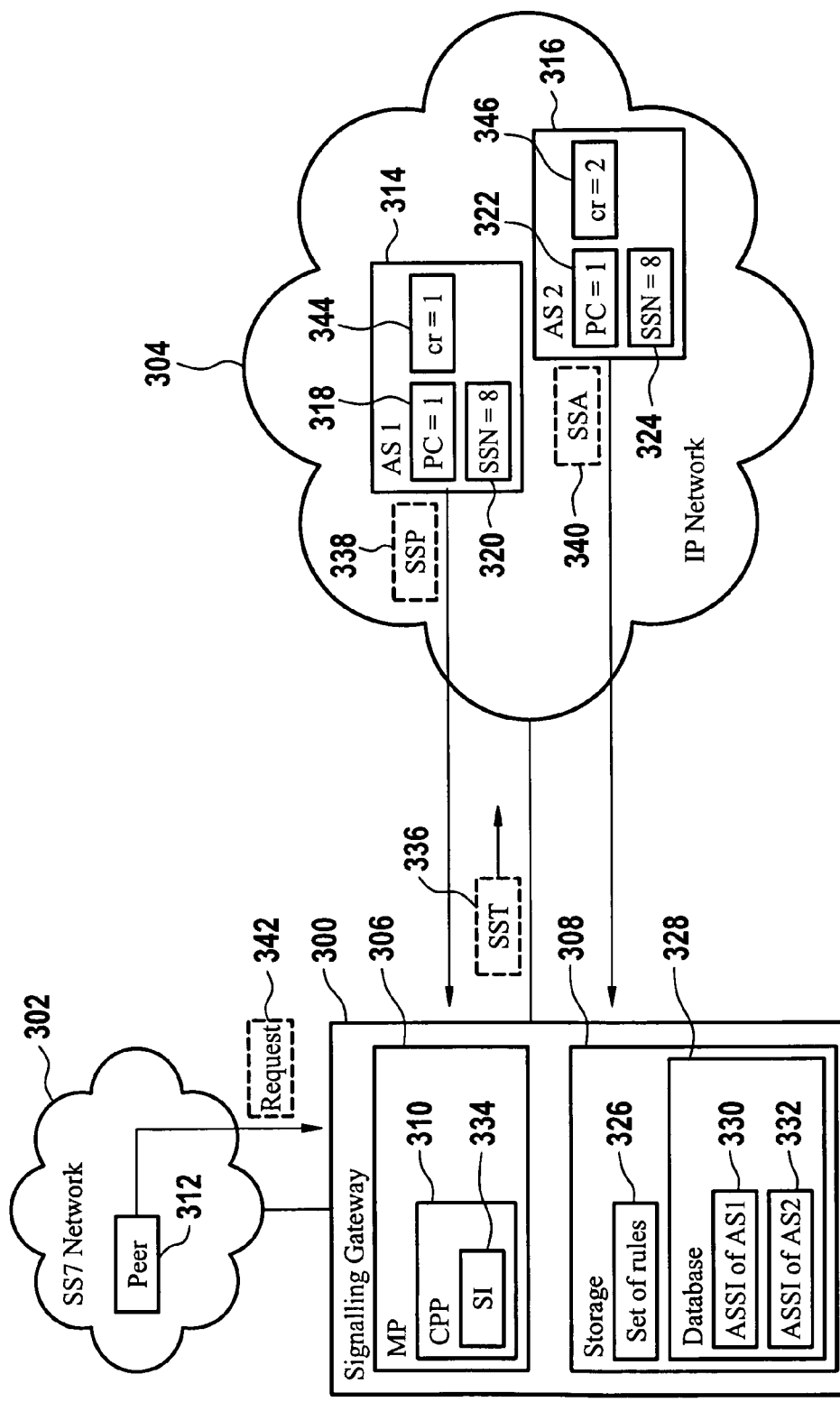
FIG. 3 shows schematically an embodiment of a signaling gateway in accordance with the invention interconnecting a SS7 network and an IP network.

FIG. 3 shows schematically an embodiment of a signaling gateway 300 interconnecting a SS7 network 302 and an IP network 304. The signaling gateway 300 comprises a microprocessor 306 and a storage 308. The microprocessor 306 executes a computer program product 310 which is for example permanently stored on the storage 308 and loaded for execution into the microprocessor 306. The SS7 network 302 comprises at least one peer 312 which can be seen as a node of the SS7 network 302.

The IP network 304 comprises a first application server 314 and a second application server 316. The application servers 314 and 316 can be regarded as nodes of the IP network 304 or as components of nodes of the IP network 304 or they can be regarded as functional entities distributed over several nodes of the IP network 304. With respect to the MTP3 or the M3UA-layer (see FIG. 2), the first application server 314 is identifiable by a point code 318 (PC=1). The application server 314 further provides an application, also referred to as application service, which can be identified with respect to the SCCP-layer (see FIG. 2) by use of a subsystem number 320 (SSN=8). Furthermore, the second application server 316 can be identified with respect to the MTP3 and M3UA-layer by a point code 322 (PC=1) and an application service provided by the second application server 316 is addressed via the subsystem number 324 (SSN=8). In the following, it is assumed that the point codes 318 and 322 (PC=1) and the subsystem numbers 320 and 324 (SSN=8) are equal and thus that the applications provided by the application servers 314 and 316 are identical. Thus, as seen from the SS7 network's 302 point of view, an application service is provided by the applications with PC=1, SSN=8 via the first and second application servers 314 and 316. Or, in other words, the application service is implemented on both application servers 314 and 316 sharing the same PC=1 and SSN=8. The application servers can be distinguished and addressed independently by other criteria (cr). The application server 314 has a criteria list 1 (cr=1) 344 and the application server has a criteria list 2 (cr=2) 346, which differs from the criteria list 1 344.

The application servers 314 and 316 are completely independent from each other and they might not be even aware of each other. An application server can be in three states; that is an application server can be available, congested or unavailable for a peer. In order to determine the availability of the first application server 314, the computer program product 310 sends a SCCP subsystem test (SST) message 336 to the application server 314, which responds either by a SCCP subsystem allowed (SSA) message indicating that the application server is available, with a SCCP subsystem congested (SSC) message indicating that the application server is congested, or with a SCCP subsystem prohibited message (SSP) indicating that it is currently unavailable. In the following it is assumed that the first application server 314 sends a SCCP SSP message 338 in response to the SCCP SST message 336. The SCCP SSP message 338 is received by the signaling gateway 300. The storage 308 comprises a database 328. The computer program product 310 analyzes the SCCP SSP message 338 and is thereby able to identify that that application server 314 is currently unavailable. The computer program product 310 stores an application server status information 330 for the application server 314 indicating that the application server 314 is unavailable.

Similarly, in response to the reception of an SCCP SST message 336, the second application server 316 sends an SCCP SSA message 340 indicating that it is available. The computer program product 310 receives the SCCP SSA message and stores in response to the reception of the SCCP SSA message 340 an application server status information 332 for the second application server 316 which indicates the availability of the application server 316.

Before the peer 312 sends data traffic to an application service by use of a point code and a subsystem number, the peer 312 might request the status of the application service having a particular SSN, e.g. SSN=8, via a request 342. The request 342 is received by the signaling gateway 300. The point code and subsystem number specified in the request 342 through which the application service can be identified is extracted from the request 342 by the computer program product 310. If the request 342 comprises for example the point code 1 and the subsystem number 8, the signaling gateway 300 is able to identify that the peer 312 wishes to receive the status information of the application service having SSN=8.

As the application service is however provided by the first and second application servers 314 and 316, the status of the application service with SSN=8 depends on the status of the first application server 314 and also on the status of the second application server 316. In order to provide therefore a status information 334 of the application service identified by SSN=8, the computer program product 310 accesses the database 328 and reads out the application server status information 330 and the application server status information 332 and determines from the two application server status information 330 and 332 the status information by use of a set of rules 326 which is stored on the storage 308.

The set of rules 326 can for example specify that a SCCP SSP message is sent to the peer 312, if both application servers 314 or 316 are unavailable, that a SCCP SSC message is sent to the peer 312, if at least one application server is congested, and that a SCCP SSA message is sent to the peer 312 if at least one of the application servers 314 and 316 implementing the application service is available.

As the first application server 314 is unavailable and the second application server 316 is available (see above), the status information 334 therefore corresponds to a SCCP SSA message which is sent to the peer 312 indicating the availability of the application service. The method in accordance with the invention is advantageous as the status information 334 of the application service which is consolidated on the signaling gateway 300 from up to date application server status information is provided to the requesting peer 312.

The peer 312 might also sent data, e.g. in response to the reception of the SCCP SSA message which indicates the global availability of the application service to one of the application servers 318, 346, whereby the application server is addressed by use of the corresponding PC, SSN, and other criteria. For example, data might be sent to the application server 314, whereby the PC, SSN, and other criteria of the application server 314 are specified in message fields employed for routing the data to the corresponding application server 314. As the first application server 314 is unavailable (see above), the data cannot be further routed from the signaling gateway to the first application server 314. The application server sends according to an embodiment of the method in accordance with the invention an error message via the protocol on top of SCCP to the peer 312 indicating the unavailability of the first application server 314 despite the global availability of the application service.

Figure 4:
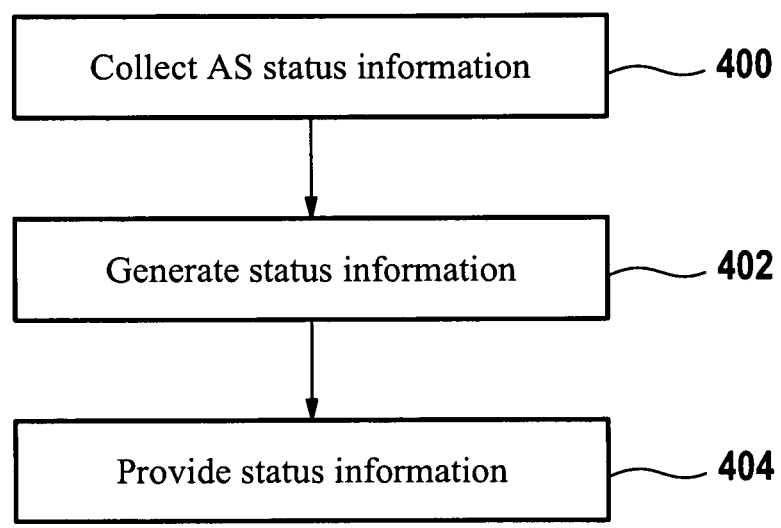
FIG. 4 shows a flow diagram illustrating steps performed by a method in accordance with the invention.

FIG. 4 shows a flow diagram illustrating steps performed by a method of signaling status information of an application service in accordance with the invention. The method is performed by a signaling gateway which interconnects an IP network and a SS7 network. According to step 400 of the method in accordance with the invention, application server status information of application servers associated with the application service are collected. Further, according to step 402 of the method in accordance with the invention, the status information of the application service is generated from the collected application server status information by use of a given set of rules. The generated status information is then provided to at least one peer which is comprised in the IP network or in the SS7 network, wherein the peer might have requested for the status information or wherein the peer is comprised in a list of peers, wherein the peers in the list of peers are associated with the application service.

Figure 5:
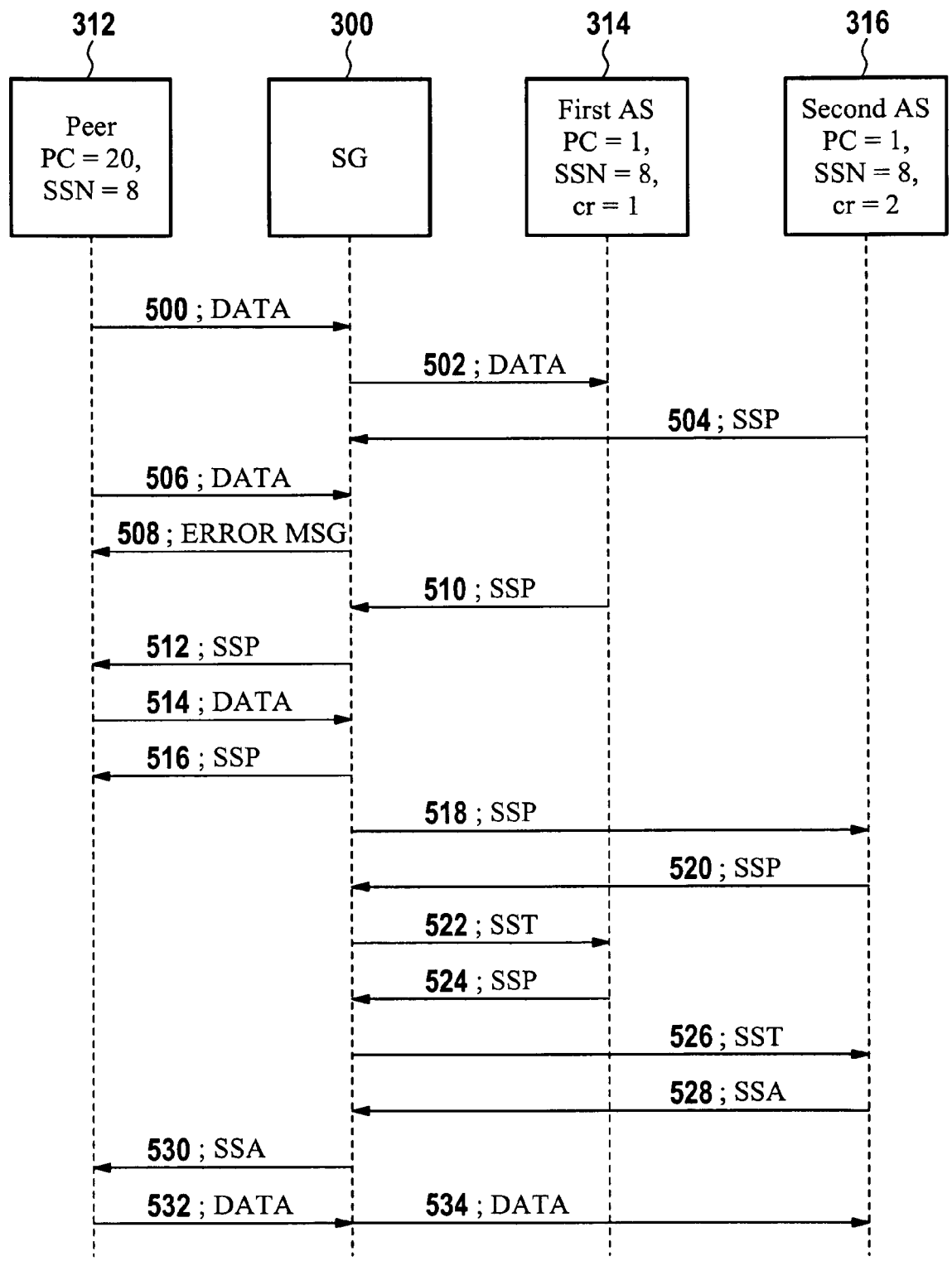
FIG. 5 shows a sequence of operation diagram illustrating steps performed according to an embodiment of the method in accordance with the invention.

FIG. 5 shows a sequence of operation diagram, where the peer 304 with PC=20 and SSN=8 communicates with the first application server (AS) 314 having PC=1, SSN=8, and a set of criteria 1 (cr=1) and with the second application server 316 having PC=1, SSN=8, and a set of criteria 2 (cr=2) via the signaling gateway (SG) 300. The reference numerals for the various interacting components have been taken from FIG. 3. It is assumed that both application servers 314, 316 are initially available.

In step 500, the peer transmits data intended for the first application server with PC=1, SSN=8, and the set of criterial (cr=1) to the signaling gateway. The signaling gateway is able to identify that the data is to be further routed to the first application server having PC=1, SSN=8, cr=1 because the peer employed the PC, SSN, and the set of criteria 1 (cr=1) of the first application server 314 in the header information comprised in the data. As the application server 314 is available, the signaling gateway forwards the data in step 502 to the corresponding application server with PC=1 and SSN=8 and the set of criteria 1 (cr=1).

In step 504, the signaling gateway receives a SCCP SSP message from the second application server 316 with PC=1 and SSN=8 and the set of criteria 2 (cr=2). The second application server has thereby informed the signaling gateway about a status change. The application service provided by the second application server is now unavailable. However, as the first application server 314 is available, the application service (with PC=1 and SSN=8) implemented by the first and second application servers is still (globally) available. The peer 312 might thus send in step 506 data intended for the second application server 316 with PC=1, SSN=8, cr=2 to the signaling gateway by specifying PC=1, SSN=8, cr=2 in the header information. As the second application server 316 is unavailable, the signaling gateway sends in step 508 an error message according to the protocol on top of SCCP to the peer 312 indicating the unavailability of the second application server 316.

In step 510, the first application server 314 sends a SCCP SSP message to the signaling gateway 300 indicating that it has become unavailable. As the second application server 316 is also unavailable (cf. step 504), the status of the application service changes from available to unavailable. The signaling gateway signals the unavailability of the application service by sending a SCCP SSP message to the peer in step 512.

In step 514, the signaling gateway receives further data from the peer 312 in which PC=1, SSN=8, cr=2 is employed in the header data in order to indicate the second application server as destination. Since the second application server is still unavailable, the signaling gateway 300 sends in step 516 a SCCP SSP message to the peer.

In step 518, the signaling gateway 300 monitors the status of the second application server 316 by sending a SCCP SST message to the second application server. As the second application server 316 is unavailable, it sends in step 520 a SCCP SSP message. Similarly, the signaling gateway 300 monitors the status of the first application server 314 by sending in step 522 a SCCP SST message to the first application server 514. As the first application server 314 is unavailable, it sends in step 524 a SCCP SSP message. In step 526, the signaling gateway 300 monitors again the status of the second application server 316 by sending a SCCP SST message to the second application server 316. As the second application server 316 has in the meantime become available, it sends in step 528 a SCCP SSA message to the signaling gateway.

As the second application server 316 has become available, the application service implemented via the first and second application servers 314 and 316 has become available and hence, the signaling gateways signals the status change of the application service to the peer 312 by sending in step 530 a SCCP SSA message to the peer 312.

The peer sends in step 532 again data to the second application server 316 by use of PC=1, SSN=8 and cr=2 in the data header. As the second application server 316 is available, the signaling gateway further sends the data in step 534 to the second application server 316.

| List of Reference Numerals | |
|---|---|
| 100 | Signaling gateway |
| 102 | SS7 network |
| 104 | IP network |
| 106 | Peer |
| 108 | Peer |
| 110 | Application server |
| 112 | Application server |
| 114 | Application server |
| 200 | SCCP-layer |
| 202 | M3UA-layer |
| 204 | SCTP-layer |
| 206 | IP-layer |
| 208 | MTP3-layer |
| 210 | MTP2-layer |
| 212 | Layer-1 |
| 300 | Signaling gateway |
| 302 | SS7 network |
| 304 | IP network |
| 306 | Microprocessor |
| 308 | Storage |
| 310 | Computer program product |
| 312 | Peer |
| 314 | Application server |
| 316 | Application server |
| 318 | Point code |
| 320 | Subsystem number |
| 322 | Point code |
| 324 | Subsystem number |
| 326 | Set of rules |
| 328 | Database |
| 330 | Application server status information |
| 332 | Application server status information |
| 334 | Status information |
| 336 | SCCP SST message |
| 338 | SCCP SSP message |
| 340 | SCCP SSA message |
| 342 | Request |
| 344 | Connection request address |
| 346 | Connection request address |

The invention claimed is:

1. A method of signaling status information of an application service, the method being performed by a signaling gateway, the signaling gateway interconnecting an internet protocol (IP) network and a signaling system 7 (SS7) network, the method comprising:
collecting application server status information of application servers associated with the application service,
generating the status information of the application service from the collected application server status information by use of a given set of rules, wherein the status information is generated for signaling the status information to at least one peer, wherein the at least one peer is comprised in the IP network or in the SS7 network,
wherein one of said application servers is hosted by one or more nodes of the IP network, wherein a point code (PC) and a subsystem number (SSN) is assigned to each application server, wherein the application servers associated with the application service share the same point code and the same subsystem number,
wherein the application server status information of the application server specifies the status of the application server as one of: available, unavailable, and congested,
wherein the application server status information is collected by receiving one of a Signaling Connection Control Part (SCCP) Subsystem Allowed (SSA) message indicating the availability of the application server, a SCCP Subsystem Prohibited (SSP) message indicating the unavailability of the application server, and a SCCP Subsystem Congest (SSC) message from the application server indicating the congestion of the application server, and wherein the signaling gateway monitors the status of the application server by sending a SCCP subsystem test (SST) message to the application server, wherein in response to the SCCP SST message the SCCP SSA message or the SCCP SSP message or the SCCP SSC message is received from the application server depending on the status of the application server.

2. The method according to claim 1, wherein the signaling gateway sends a SCCP SST message to the application server in response to the reception of a SCCP SSP message, in response to the reception of a SCCP SSC message or in response to the reception of a Message Transfer Part (MTP)-resume message from the application server.

3. The method according to claim 1, wherein the application server status information of the application servers are stored in a database linked with the signaling gateway, wherein the database is updated with respect to the status information of the application server if a SCCP SSA message, a SCCP SSP message, or a SCCP SSC message of the application server is received.

4. The method according to claim 1, wherein the given set of rules specifies that a SCCP SSP message is sent to the at least one peer, if all application servers associated with the application service are unavailable, and wherein the given set of rules specifies that a SCCP SSA message is sent to the at least one peer, if at least one application server associated with the application service is available, or wherein an error message in accordance with a protocol is sent, wherein the protocol is the protocol on top of SCCP.

5. A computer program product, the computer program product comprising:

a non-transitory computer readable storage medium having computer readable code embodied therewith, said computer readable program code comprising:

computer readable program code to cause a signaling gateway to collect application server status information from a number of application servers associated with an application service, the signaling gateway interconnecting an Internet Protocol (IP) network and a Signal System 7 (SS7) network;

computer readable program code to generate the status information of the application service from the collected application server status information by use of a given set of rules, wherein the status information is generated for signaling the status information to at least one peer, wherein the at least one peer is comprised in the IP network or in the SS7 network;

wherein one of said application servers is hosted by one or more nodes of the IP network, wherein a point code (PC) and a subsystem number (SSN) is assigned to each application server, wherein the application servers associated with the application service share the same point code and the same subsystem number;

wherein the application server status information of the application server specifies the status of the application server as one of: available, unavailable, and congested, wherein the application server status information is collected by receiving one of a Signaling Connection Control Part (SCCP) Subsystem Allowed (SSA) message indicating the availability of the application server, a SCCP Subsystem Prohibited (SSP) message indicating the unavailability of the application server, and a SCCP Subsystem Congest (SSC) message from the application server indicating the congestion of the application server; and wherein the signaling gateway monitors the status of the application server by sending a SCCP subsystem test (SST) message to the application server, wherein in response to the SCCP SST message the SCCP SSA message or the SCCP SSP message or the SCCP SSC message is received from the application server depending on the status of the application server.

6. The computer program product of claim 5, wherein the signaling gateway sends a SCCP SST message to the application server in response to one of: reception of a SCCP SSP message, reception of a SCCP SSC message, and reception of a Message Transfer Part (MTP)-resume message from the application server.

7. A signaling gateway interconnecting an internet protocol (IP) network and a signaling system 7 (SS7) network, the signaling gateway to:

collect application server status information from a number of application servers associated with the application service, generate the status information of the application service from the collected application server status information by use of a given set of rules, wherein the status information is generated for signaling the status information to at least one peer, wherein the at least one peer is comprised in the IP network or in the SS7 network, wherein one of said application servers is hosted by one or more nodes of the IP network, wherein a point code (PC) and a subsystem number (SSN) is assigned to each application server, wherein the application servers associated with the application service share the same point code and the same subsystem number;

wherein the application server status information of the application server specifies the status of the application server as one of: available, unavailable, and congested;

wherein the application server status information is collected by receiving one of: a Signaling Connection Control Part (SCCP) Subsystem Allowed (SSA) message indicating the availability of the application server, a SCCP Subsystem Prohibited (SSP) message indicating the unavailability of the application server, and a SCCP Subsystem Congest (SSC) message from the application server indicating the congestion of the application server;

wherein the signaling gateway monitors the status of the application server by sending a SCCP subsystem test (SST) message to the application server; and wherein in response to the SCCP SST message the SCCP SSA message or the SCCP SSP message or the SCCP SSC message is received from the application server depending on the status of the application server.

8. The signaling gateway of claim 7 wherein said signaling gateway is part of a network comprising one or more signaling gateways.

9. The signaling gateway of claim 7, wherein the signaling gateway sends a SCCP SST message to the application server in response to one of: reception of a SCCP SSP message, reception of a SCCP SSC message, and reception of a Message Transfer Part (MTP)-resume message from the application server.

10. The signaling gateway of claim 7, wherein the application server status information of the application servers are stored in a database linked with the signaling gateway, the database being updated with respect to the status information of the application server in response to reception of one of: a SCCP SSA message, a SCCP SSP message, and a SCCP SSC message from the application server.

11. The signaling gateway of claim 7, wherein:
the given set of rules specifies that a SCCP SSP message is sent to the at least one peer if all application servers associated with the application service are unavailable;
the given set of rules specifies that a SCCP SSA message is sent to the at least one peer if at least one application server associated with the application service is available; and
an error message in accordance with a protocol is sent, the protocol being on top of SCCP.

* * * * *